(12) United States Patent
Jang

(10) Patent No.: US 7,773,192 B2
(45) Date of Patent: Aug. 10, 2010

(54) METHOD FOR MEASURING A CELL GAP IN A LIQUID CRYSTAL DISPLAY

(75) Inventor: Yang-Gyu Jang, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 1131 days.

(21) Appl. No.: 11/322,481

(22) Filed: Dec. 30, 2005

(65) Prior Publication Data

US 2006/0146273 A1 Jul. 6, 2006

(30) Foreign Application Priority Data

Jan. 3, 2005 (KR) .................. 10-2005-0000172

(51) Int. Cl.
*G02F 1/13* (2006.01)
(52) U.S. Cl. .................. 349/187; 349/155; 349/189
(58) Field of Classification Search .............. 349/187, 349/155
See application file for complete search history.

(56) References Cited

U.S. PATENT DOCUMENTS 5,568,297 A 10/1996 Tsubota et al.
2002/0047983 A1* 4/2002 Chen et al. ................. 349/187
2005/0140914 A1* 6/2005 Sawasaki et al. ........... 349/155

FOREIGN PATENT DOCUMENTS

| CN | 1489684 | 4/2004 |
|---|---|---|
| JP | 2001-154166 | 6/2001 |
| JP | 2004-348054 | 12/2004 |

* cited by examiner

*Primary Examiner*—David Nelms
*Assistant Examiner*—Thanh-Nhan P Nguyen
(74) *Attorney, Agent, or Firm*—Innovation Counsel LLP

(57) ABSTRACT

A system for manufacturing liquid crystal displays is provided, which includes: a sealant-applying unit for depositing a sealant on one of the two panels having at least one liquid crystal cell area and a cell gap measuring pattern formed outside of the liquid crystal cell area; a liquid crystal depositing unit for depositing liquid crystal material on the liquid crystal cell area and the cell gap measuring pattern; a substrate-attaching unit for receiving the two panels from the sealant-applying unit or the liquid crystal depositing unit, then conjoining the panels in a vacuum state to complete the manufacture of a liquid crystal panel; and a the cell gap measuring unit for measuring a cell gap between the two panels by detecting the spread areas of liquid crystal material deposited on the cell gap measuring pattern.

9 Claims, 5 Drawing Sheets

METHOD FOR MEASURING A CELL GAP IN A LIQUID CRYSTAL DISPLAY

RELATED APPLICATIONS

This patent application claims priority from Korean Patent Application No. 10-2005-0000172 filed on Jan. 3, 2005, the content of which is incorporated herein by reference in its entirety and for all purposes.

BACKGROUND OF THE INVENTION (a) Field of the Invention

The present invention relates to liquid crystal displays, and more specifically to a method for measuring a cell gap in a liquid crystal display.

(b) Description of the Related Art

A liquid crystal display (LCD) is one of the most widely used flat panel displays. An LCD includes two panels provided with field-generating electrodes such as pixel electrodes, and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

According to a method of fabricating the LCD, alignment films for aligning the liquid crystal molecules of the liquid crystal material are coated on the two panels and are subject to alignment treatment. Spacers are spread on one of the panels, and a sealant is printed on the periphery of the panel such that the sealant has a liquid crystal injection hole. The two panels are aligned and attached to each other by hot press. A liquid crystal material is injected between the two panels through the injection hole and the injection hole is sealed, thereby forming a liquid crystal cell.

Recently, a panel assembly made of one mother glass having a plurality of liquid crystal cell areas is manufactured to improve efficiency in fabricating the LCD. The panel assembly is separated into liquid crystal cell areas by scribing the panel assembly before the injection of the liquid crystal material.

However, this process is not without drawbacks. Measuring the panel assembly or the liquid crystal cell is often difficult, as the measuring device is usually located remotely, requiring the panel or cell to be moved.

Furthermore, the fill state of the liquid crystal material is generally inspected after combining two panels in the manufacturing process of the LCD. However, even when defects in fill state are detected, it is difficult to determine the root cause, as problems with gravity-caused defects, height of interval member and the amount of the liquid crystal material all can generate such defects.

SUMMARY OF THE INVENTION

It is an object of the present invention to provide a method for easily measuring a cell gap, method for manufacturing a liquid crystal display including the method, device for manufacturing a cell gap, and system including the device.

In one embodiment, a system for manufacturing liquid crystal displays having two panels, at least one panel of the two panels having a liquid crystal cell area for fabricating a liquid crystal cell, and a cell gap measuring pattern formed outside of the liquid crystal cell area, comprises a sealant-applying unit for depositing a sealant on one of the two panels. The system further has a liquid crystal depositing unit for depositing liquid crystal material on the liquid crystal cell area and the cell gap measuring pattern. The system also has a substrate-attaching unit for receiving the two panels from the sealant-applying unit or the liquid crystal depositing unit, and conjoining the panels so as to generate spread areas resulting from an increase in an area of the two panels covered by the deposited liquid crystal material upon the conjoining. Also included is a cell gap measuring unit for measuring a cell gap between the two panels according to the spread areas of liquid crystal material deposited on the cell gap measuring pattern system In another embodiment, a method of manufacturing liquid crystal displays is provided, the method including: dispersing spacers on one of two panels of a mother glass, the mother glass having at least one liquid crystal cell area and a cell gap measuring pattern formed outside of the liquid crystal cell area; depositing a sealant on one of the two panels; depositing liquid crystal material on the panels on which the sealant is deposited of the liquid crystal cell area and the cell gap measuring pattern; conjoining the two panels so as to generate spread areas resulting from an increase in an area of the two panels covered by the deposited liquid crystal material upon the conjoining; and measuring a cell gap between the two panels by detecting the spread areas of liquid crystal material deposited on the cell gap measuring pattern.

In another embodiment, a method of measuring a cell gap is provided, the method including: forming a cell gap measuring pattern having lattice or net shapes defining the same area on a fist panel; depositing liquid crystal material on the cell gap measuring pattern of the first panel; conjoining a second panel facing the first panel, and the first panel so as to generate spread areas resulting from an increase in an area of the two panels covered by the deposited liquid crystal material upon the conjoining; and measuring a cell gap between the two panels by detecting the number of the spread lattice areas of liquid crystal material deposited on the cell gap measuring pattern.

DETAILED DESCRIPTION OF EMBODIMENTS

Figure 1:
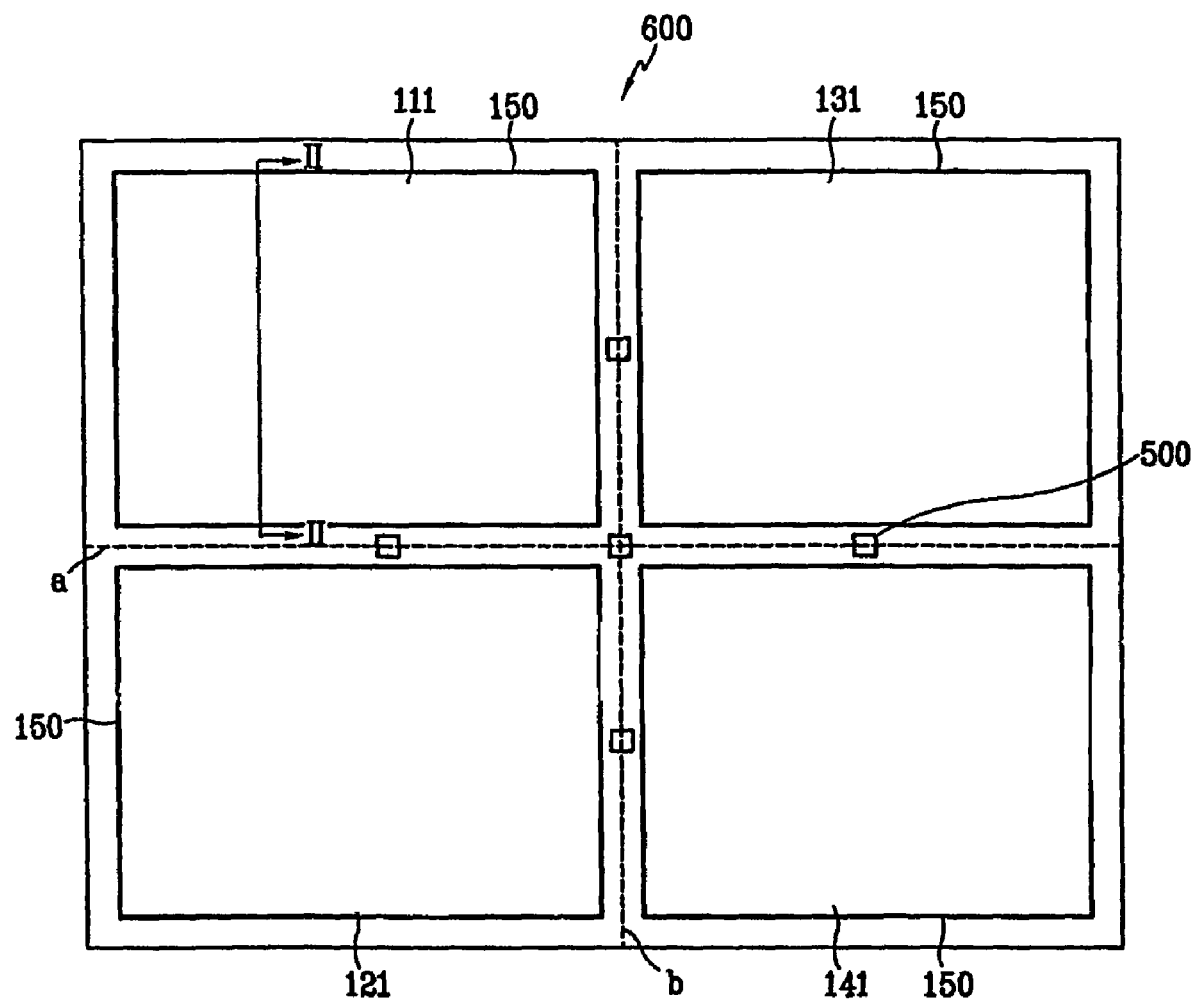
FIG. 1 is a plan view of a liquid crystal panel assembly for a liquid crystal display produced using an system according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thicknesses of layers, films and regions are exaggerated for clarity. Like numerals refer to like elements throughout. It will be understood that when an element such as a layer, film, region or panel is referred to as being "on" another element, it can be directly on the other element or intervening elements may also be present. In contrast, when an element is referred to as being "directly on" another element, there are no intervening elements present.

The structure of a liquid crystal panel assembly fabricated according to an embodiment of the present invention will be first described.

Figure 2:
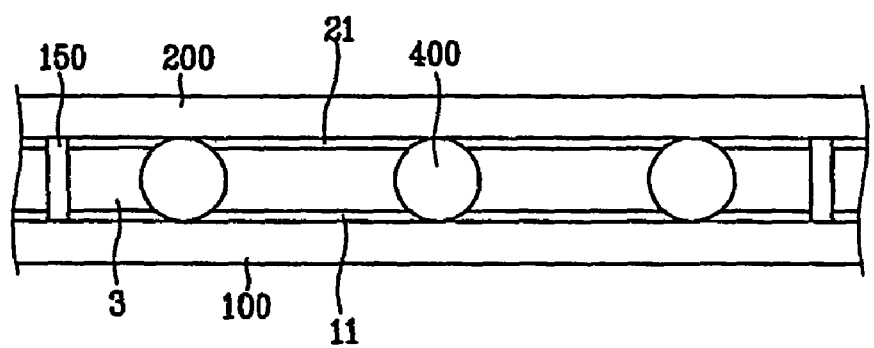
FIG. 2 is a sectional view of the liquid crystal panel shown in FIG. 1 taken along line II-II' of FIG. 1.

FIG. 1 is a plan view of a liquid crystal panel assembly for a liquid crystal display produced according to an embodiment of the present invention, and FIG. 2 is a sectional view of the liquid crystal panel shown in FIG. 1 taken along line II-II' of FIG. 1. The figures show the liquid crystal panel assembly after the completion of a panel assembling process.

As shown in FIGS. 1 and 2, a liquid crystal panel assembly 600 includes one mother glass and a plurality of liquid crystal cells. Four liquid crystal cell areas 111, 121, 131 and 141 are provided on the exemplary panel assembly 600 shown in FIG. 1, which includes two insulating panels 100 and 200 facing each other and a liquid crystal layer 3 between the panels 100 and 200. Spherical spacers 400 are mixed in with the liquid crystal layer 3. The spacers 400 maintain a predetermined cell gap between the panels 100 and 200 such that the panels 100 and 200 are substantially parallel. Further, sealant 150 is formed around the edges of each liquid crystal cell area 111, 121, 131 and 141 such that the liquid crystal layer 3 is sealed between the panels 100 and 200. The sealant 150 may contain spacers to support the two panels 100 and 200 in a parallel manner, these spacers commonly being columnar spacers that are formed through a photolithography process.

Furthermore, a liquid crystal panel assembly 600 includes a plurality of cell gap measuring patterns 500 which are disposed at the outside of the areas enclosed by the sealants 150, and are used to measure the gap between the two panels 100 and 200. The cell gap measuring patterns 500 are used to measure the cell gap using the area occupied by the liquid crystal material after combining the panels 100 and 200, as will be described in detail with reference to the drawings.

In a method of fabricating an LCD according to an embodiment of the present invention, the liquid crystal layer 3 is formed in a region where the liquid crystal panel assembly 600 is not divided into liquid crystal cell areas 111, 121, 131 and 141. The division takes place along cut lines "a" and "b", and the cutting into separate cell areas 111, 121, 131 and 141 occurs only after both the liquid crystal layer formation process and the panel assembling process have been completed.

The panels 100 and 200 of the liquid crystal panel assembly 600 include a number of known elements for producing images from an LCD array, such as a plurality of signal wires for transmitting electrical signals such as scanning signals or picture signals, the signal wires intersecting each other to define pixel areas. The panels 100 and 200 further include a plurality of thin film transistors which are switching elements for controlling the picture signals, as well as a plurality of pixel electrodes and a common electrode for generating electric fields to drive the liquid crystal molecules. In addition, the panels 100 and 200 include a plurality of red, green and blue color filters for displaying the picture images. The cell gap measuring patterns 500 are formed in the same layer as an opaque layer such as the signal lines, a light blocking member or the color filters.

The field-generating electrodes such as pixel electrodes and a common electrode generally may be respectively arranged on the two panels 100 and 200, or one of the two panels 100 and 200, and may include a plurality of cutouts as domain controlling means to enhance viewing angle.

The molecular director of the liquid crystal layer 3 parallel to the two panels 100 and 200 may rotate on going from one panel to the other panel, and may be vertically arranged with the surfaces of two panels 100 and 200 absent of the electric field.

The structure of an system including a device for measuring a cell gap used in a process of fabricating an LCD according to an embodiment of the present invention will be now described in detail.

Figure 3:
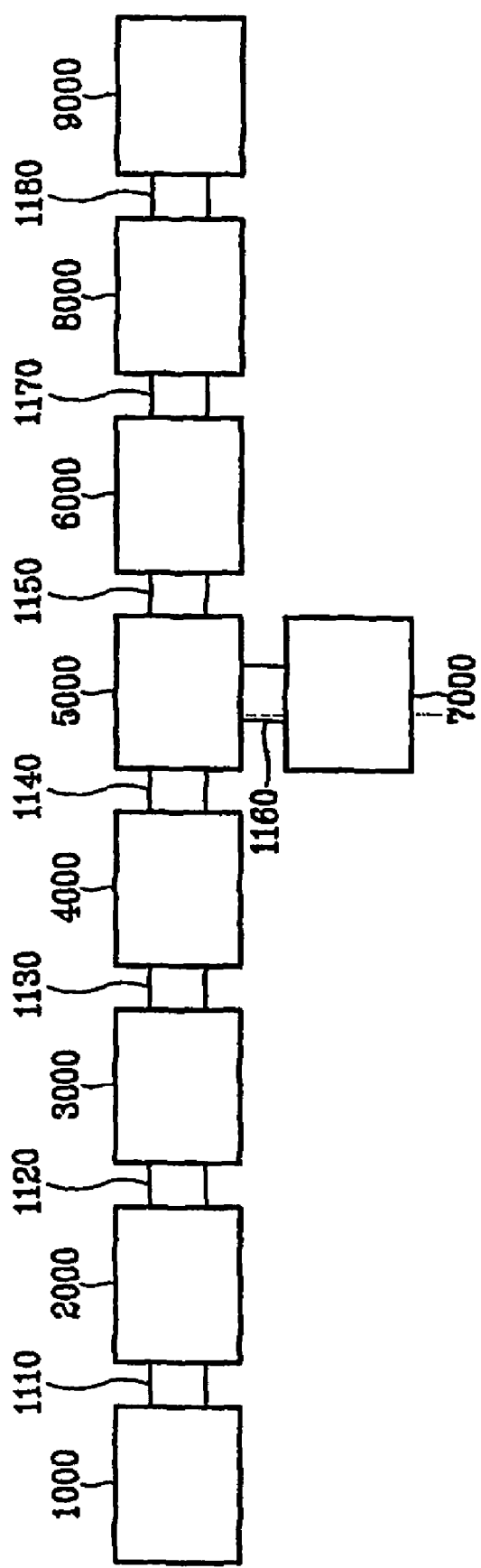
FIG. 3 is a schematic block diagram of an system including a device for measuring a cell gap for manufacturing liquid crystal displays according to a preferred embodiment of the present invention.
Figure 4:
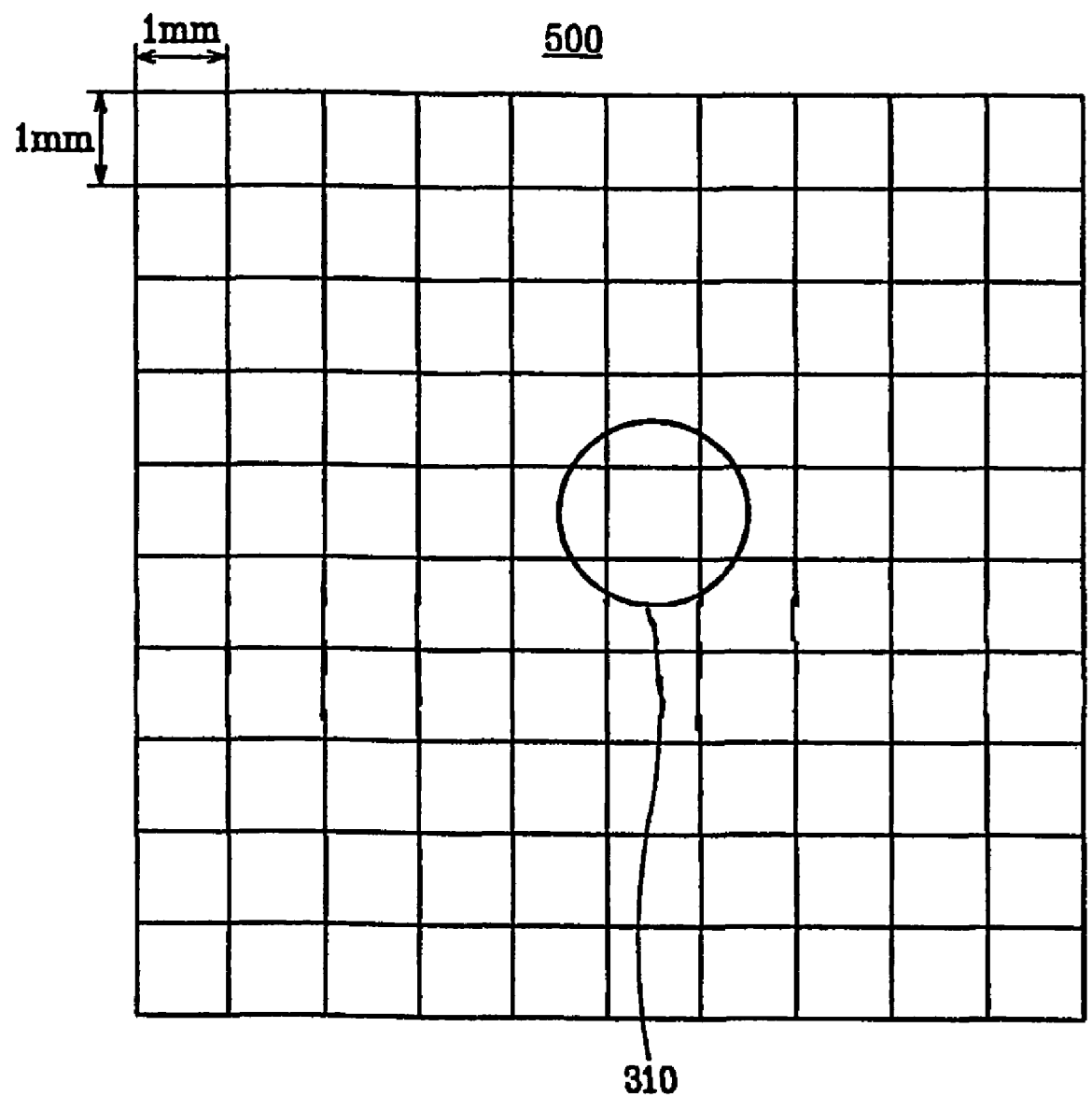
FIG. 4 is a plan view showing a structure of a measure pattern used in a method for measuring a cell gap according to an embodiment of the present invention.
Figure 5:
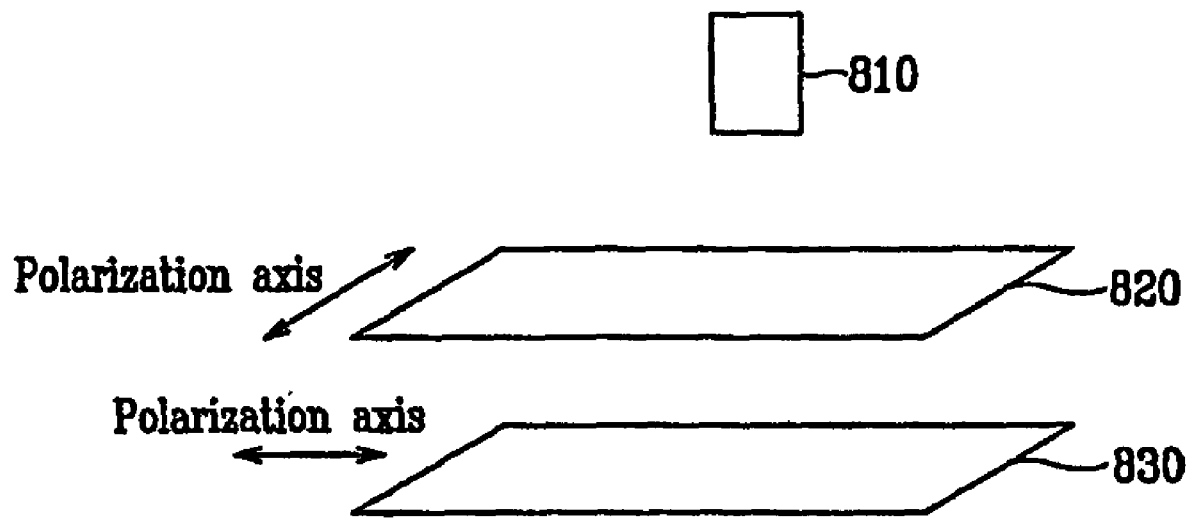
FIG. 5 is a schematic view illustrating the structure of a device for measuring a cell gap of the system according to an embodiment of the present invention.
Figure 6A:
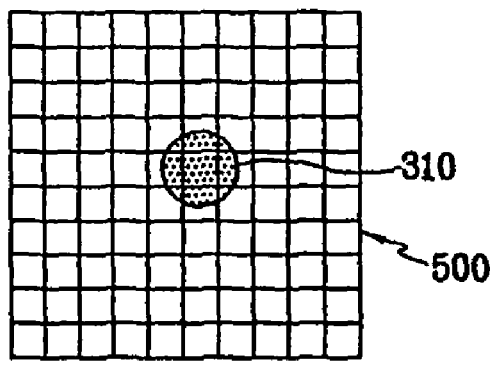
FIGS. 6A to 6C are plan views showing process measuring the cell gap using the device for measuring a cell gap of the system according to an embodiment of the present invention.
Figure 6B:
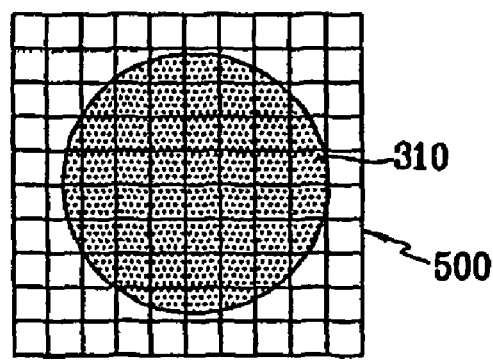
Figure 6C:
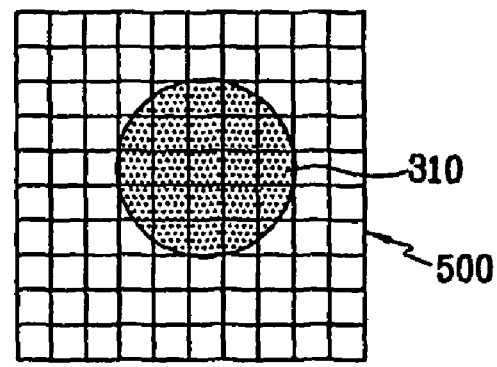

FIG. 3 is a schematic block diagram of an in-line LCD panel fabrication system including a device for measuring a cell gap for manufacturing liquid crystal displays according to a preferred embodiment of the present invention. FIG. 4 is a plan view showing a structure of a measuring pattern used in a method for measuring a cell gap according to an embodiment of the present invention. FIG. 5 is a schematic view illustrating the structure of a device for measuring a cell gap of the system; and FIGS. 6A to 6C are plan views illustrating measuring of the cell gap according to an embodiment of the present invention.

Referring to FIG. 3, an system for manufacturing liquid crystal displays according to a preferred embodiment of the present invention includes a first loading unit 1000, a spacer-dispersing unit 2000, a sealant-applying unit 3000, a liquid crystal depositing unit 4000, a panel-combination unit 5000, a second loading unit 7000, a panel-attaching unit 6000, a cell gap measuring unit 8000 and an unloading unit 9000.

Provided between the first loading unit 1000, the spacer-dispersing unit 2000, the sealant-applying unit 3000, the liquid crystal depositing unit 4000, the panel-combination unit 5000, the second loading unit 7000, the panel-attaching unit 6000, the cell gap measuring unit 8000, and the unloading unit 9000 are in-line conveying units 1110, 1120, 1130, 1140, 1150, 1170 and 1180 for conveying the panels 100 and 200 from one process unit to the next. The second loading unit 7000 is connected to the panel-combination unit 5000 through an in-line conveying unit 1160. Since the attachment of the panels 100 and 200 at the panel-attaching unit 6000 occurs in a state where a vacuum is formed between the panels 100 and 200, the in-line conveying units 1150 and 1170 may be equipped to connect vacuum chambers.

Manufacture of a liquid crystal display using the system above will now be described.

First, the panel 100, which is loaded on the first loading unit 1000, is transported to the spacer-dispersing unit 2000 via the in-line conveying unit 1110. The spacers 400 are dispersed at a predetermined density on an inner face of the panel 100 at the spacer-dispersing unit 2000. At this time, it is preferable that the spacers 400 be spherical or cylindrical and has a diameter that is 10-30% greater than the desired cell gap between the panels 100 and 200. Further, if the spacers 400 are simply dispersed without securing the same to the panel 110, external shocks applied during manufacture or the flow of the liquid crystal material during the depositing of the same may displace the spacers 400 from their intended positions, thereby resulting in a non-uniform cell gap between the panels 100 and 200. Accordingly, it is often preferable that the spacers 400 are adhered to the panel 100 after being dispersed is the invention allows this to be realized in any manner, but can for example be performed by coating the spacers 400 with an adhesive, which is made from an epoxy group polymer. Next, infrared rays are irradiated onto the panel 100 and the spacers 400 dispersed thereon such that the adhesive on an upper portion of the spacers 400 melts and flows downward to fully surround a lower portion of the spacers 400 and affix them to their positions on the panel 100. Instead of dispersing the spacers 400 in this manner, it is possible for an insulating layer to be deposited on the panel 100 and patterned to form a plurality of columnar spacers through a photolithography process. When the dispersing of the spacers 400 exchanges by the photolithography process, an additional process is not generated, and such an alternative process is particularly advantageous for large panels with the uniform and predetermined positions. At this time, the cell gap measuring patterns 500 are formed on the panel 100 (which can be accomplished by typical fabrication processes), and it is preferable that the cell gap measuring patterns 500 are formed with the same layer as an opaque layer such as the signal lines, a light blocking member and the color filters. An additional process may be necessary to form the cell gap measuring patterns 500. The cell gap measuring patterns 500 are preferably made of lattice or net shapes defining a plurality of the same areas (for example 1 mm×1 mm).

Following the above, the panel 100 is transported from the spacer-dispersing unit 2000 to the sealant-applying unit 3000 via the in-line conveying unit 1120. The sealant 150 is deposited on the panel 100 at the sealant-applying unit 3000. The sealant 150 is formed in a closed configuration, that is, the sealant 150 does not include a liquid crystal injection hole as in the prior art. In addition, the sealant 150 may be realized through a heat-hardening material or an infrared ray-hardening material, and may include spacers for better maintaining the cell gap between the panels 100 and 200.

Since there is no liquid crystal injection hole formed in the sealant 150, the amount of liquid crystal material provided between the panels 100 and 200 is difficult to control. Too much liquid crystal material leads to damage to the sealant 150, while an insufficient amount of liquid crystal material results in areas that are not fully filled with the liquid crystal material. To solve this problem, it is preferable that a buffer region(s) is formed in the sealant 150 such that liquid crystal material fully fills display portions and any excess liquid crystal material flows into the buffer region(s).

At this time, it is preferable that the sealant 150 is coated by the reaction prevention layer to prevent the liquid crystal material 3 from reacting with the sealant 150, and an infrared ray-hardening material is used for the sealant 150.

Before the attachment of the panels 100 and 200, however, the panel 100 is transported to the liquid crystal depositing unit 4000 from the sealant applying unit 3000 via the in-line conveying unit 1130. Next, using the liquid crystal depositor (not shown), predetermined amounts of the liquid crystal material are deposited such that the liquid crystal layer 3 is formed to correspond to the sizes of the liquid crystal cell regions 111, 121, 131 and 141. In addition, the liquid crystal material dot 310 is deposited in predetermined amounts on the cell gap measuring pattern 500 as shown in FIG. 6a. The liquid crystal material dot 310 is disposed at the center of the cell gap measuring pattern 500, and amounts of the liquid crystal material dot 310 are uniform. At this time, the liquid crystal depositor may be a syringe-type device such that liquid crystal material is provided in specific areas, that is, in the liquid crystal cell regions 111, 121, 131 and 141. The liquid crystal depositor may also be a spray-type device, which includes a jig and a nozzle connected to the jig, which is able to spray the liquid crystal material over an entire surface of the liquid crystal cell regions 111, 121, 131 and 141.

Following the processes performed in the liquid crystal depositing unit 5000, the panel 100 is transported to the panel-combination unit 6000 via the in-line conveying unit 1140. At the same time, the panel 200 loaded on the second loading unit 7000 is transported to the panel-combination unit 5000 through the in-line conveying unit 1160.

Next, the two panels 100 and 200 are transported to the panel-attaching unit 6000, which is a vacuum chamber, via the in-line conveying unit 1150. The panels 100 and 200 are attached to one another in a vacuum state in the panel-attaching unit 6000, thereby completing the liquid crystal panel assembly 600 (referring FIGS. 1 and 2). In the panel-attaching unit 6000, the panels 100 and 200 are mounted to the compression plates (not shown), respectively, such that they are aligned in parallel. Next, the compression plates apply a uniform force toward each other such that the panels 100 and 200 are pressed together. As a result of this force, the spacers 400 (see FIG. 2) dispersed on the panel 100 (and provided in the sealant 150 in some cases) are deformed. Also resulting from the compression force, the liquid crystal material deposited on the panel 100 is spread over the entire area of the liquid crystal cell regions 111, 121, 131 and 141 (see FIG. 1) to form the liquid crystal layer 3 (see FIG. 2).

Subsequently, after a force is applied by the compression plates such that the desired gap is obtained between the panels 100 and 200, an exposure unit (not shown) is used to irradiate infrared rays onto the panels 100 and 200 such that the sealant 150 is fully hardened. Accordingly, the panels 100 and 200 are conjoined. It is preferable that the panels 100 and 200 be precisely aligned either during the process of compressing the panels 100 and 200 or when performing the hardening process. In addition, it is preferable that an air pressurization method be used in order to apply an even pressure to the panels 100 and 200. At this time, the liquid crystal material dot 310 deposited on the cell gap measuring pattern 500 is spread by the pressure from the panels 100 and 200, generating a "spread area" or an increase in the area covered by the liquid crystal material dot 310. The spread degree of the liquid crystal material dot 310 changes depend on the cell gap of the panels 100 and 200. Accordingly, the area occupied by the liquid crystal material dot 310 depends on the cell gap of the panels 100 and 200, which in turn changes according to variations in the lattice or net shapes of the cell gap measuring pattern 500.

Next, the liquid crystal panel assembly 600 (referring to FIGS. 1 and 2) is transported to the cell gap measuring unit 8000 from the panel-attaching unit 6000 via the in-line conveying unit 1150 to measure the cell gap of the panels 100 and 200. In a method for measuring the cell gap according to the present invention, the area occupied by the liquid crystal material dot 310 in the cell gap measuring patterns 500 are measured in square units of the cell gap measuring pattern 500. For example, because the volume of the liquid crystal material is uniform under the uniform mass, if the cell gap is 4.0 μm when the number of the squares occupied by the liquid crystal material dot 310 is about 36, as shown in FIG. 6B, the cell gap is 5.85 μm when the number of the squares occupied by the liquid crystal material dot 310 is about 26, as shown in FIG. 6C. The cell gap measuring unit 8000 according to the embodiment of the present invention includes a measuring instrument 810 to detect a spread area of the liquid crystal material dot 310 and two polarizers 820 and 830 of which polarization axes ↕and ↔are crossed to more accurately measure the number of the lattice areas occupied by the liquid crystal material dot 310. When measuring the cell gap, the liquid crystal panel assembly 600 is disposed between two polarizers 820 and 830, the area occupied by the liquid crystal material dot 310 is more accurately detected by the quality of the refractive index anisotropy of the liquid crystal material dot 310, the refractive index anisotropy of the liquid crystal material generates the phase retardation of light passing two polarizers, and the transmittance of light is determined by the phase retardation of light. As described above, the measuring instrument 810 detects the spread area of the liquid crystal material dot 310 and determines the cell gap between the panels 100 and 200 with respect to the reference cell gap attained by using a reference amount of the liquid crystal material. In the present invention, the spread area of the liquid crystal material dot 310 is detected and the cell gap between the panels 100 and 200 is measured. Accordingly, when filling states of the liquid crystal layer 3 in the liquid crystal cell areas 111, 121, 131 and 141 are detected, it is easier to determine the causes generating the defects of filling state based on the results with measured cell gaps. When the liquid crystal layer 3 is not sufficiently filled between the panels 100 and 200, if the number of the spread areas of the liquid crystal material dot 310 is normal, it can be aware that the diameter of the spacers 400 or the height of a columnar spacer is higher than the predetermined size. If the number of the spread areas of the liquid crystal material dot 310 is few, it can be seen that the amount of the liquid crystal layer 3 filled between the panels 100 and 200 is not sufficient. Furthermore, when the amount of the liquid crystal layer 3 is excessive and the portion of the liquid crystal layer 3 flows into the edges of in the liquid crystal cell areas 111, 121, 131 and 141, if the number of the spread areas of the liquid crystal material dot 310 is normal, it can be seen that the diameter of the spacers 400 or the height of a columnar spacer is lower than the predetermined size. If the number of the spread areas of the liquid crystal material dot 310 is many, it can be seen that the amount of the liquid crystal layer 3 filled between the panels 100 and 200 is excessive. In this process, the measuring instrument 810 of the cell gap measuring unit 8000 can display the detected cell gaps or the defect causes based on the above described conclusions The cell gap of the liquid crystal cell areas 111, 121, 131 and 141 may be different from the detected cell gap of the portion in which the cell gap measuring patterns 500 is disposed. Thus, the cell gap of the liquid crystal cell areas 111, 121, 131 and 141 is first measured by an external measuring device as above.

After the above step, the conjoined panels 100 and 200 (i.e., the completed liquid crystal panel assembly 600) are transported to the unloading unit 9000 from the cell gap measuring unit 8000 through the in-line conveying unit 1180. Next, the liquid crystal panel assembly 600 is transported to a cutting unit (not shown) where the liquid crystal panel assembly 600 is cut into portions corresponding to the liquid crystal cell regions 111, 121, 131 and 141, thereby obtaining liquid crystal cells for LCDs.

Above described, the cell gap measuring patterns 500 including a plurality of lattice or net shapes is used in the present invention, thereby easily measuring the cell gap and thus more easily determining the causes of defects.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A system for manufacturing liquid crystal displays having two panels, at least one panel of the two panels having a liquid crystal cell area for fabricating a liquid crystal cell, and a cell gap measuring pattern formed outside of the liquid crystal cell area, the system comprising:
   a sealant-applying unit for depositing a sealant on one of the two panels;
   a liquid crystal depositing unit for depositing liquid crystal material on the liquid crystal cell area and the cell gap measuring pattern;
   a substrate-attaching unit for receiving the two panels from the sealant-applying unit or the liquid crystal depositing unit, and conjoining the panels so as to generate spread areas resulting from an increase in an area of the two panels covered by the deposited liquid crystal material upon the conjoining; and
   a cell gap measuring unit for determining a cell gap between the two panels according to the spread areas of liquid crystal material deposited on the cell gap measuring pattern.

2. The system of claim 1, wherein the cell gap measuring unit includes a measuring instrument for detecting the spread areas of liquid crystal material deposited on the cell gap measuring pattern.

3. The system of claim 2, wherein the cell gap measuring unit further includes two crossed polarizers disposed on opposite sides of the two panels.

4. The system of claim 1, wherein the cell gap measuring pattern has lattice or net shapes defining a plurality of uniform areas.

5. A method of manufacturing liquid crystal displays, comprising:
   dispersing spacers on one of two panels of a mother glass, the mother glass having at least one liquid crystal cell area and a cell gap measuring pattern formed outside of the liquid crystal cell area;
   depositing a sealant on one of the two panels;
   depositing liquid crystal material on the panels on which the sealant is deposited of the liquid crystal cell area and the cell gap measuring pattern;
   conjoining the two panels so as to generate spread areas resulting from an increase in an area of the two panels covered by the deposited liquid crystal material upon the conjoining; and
   determining a cell gap between the two panels by detecting the spread areas of liquid crystal material deposited on the cell gap measuring pattern.

6. The method of claim 5, wherein the cell gap measuring pattern has lattice or net shapes defining a plurality of uniform areas.

7. The method of claim 6, wherein the measuring further comprises: disposing the two panels between the two polarizers of which polarization axes are crossed; and detecting a number of the lattice areas occupied by the liquid crystal material.

8. The method of claim 6, wherein the cell gap measuring pattern is made of the same layer as at least one thin film formed on the two panels.

9. A method of measuring a cell gap, the method comprising:
   forming a cell gap measuring pattern having lattice or net shapes defining the same area on a first panel;
   depositing liquid crystal material on the cell gap measuring pattern of the first panel;
   conjoining a second panel facing the first panel, and the first panel so as to generate spread areas resulting from an increase in an area of the two panels covered by the deposited liquid crystal material upon the conjoining; and
   determining a cell gap between the two panels by detecting the number of the spread lattice areas of liquid crystal material deposited on the cell gap measuring pattern.

* * * * *